Oct. 10, 1944.   C. E. TACK   2,359,740
CLASP BRAKE
Filed July 8, 1942   3 Sheets-Sheet 1

INVENTOR.
Carl E. Tack
BY
Atty

Oct. 10, 1944.    C. E. TACK    2,359,740
CLASP BRAKE
Filed July 8, 1942    3 Sheets-Sheet 2
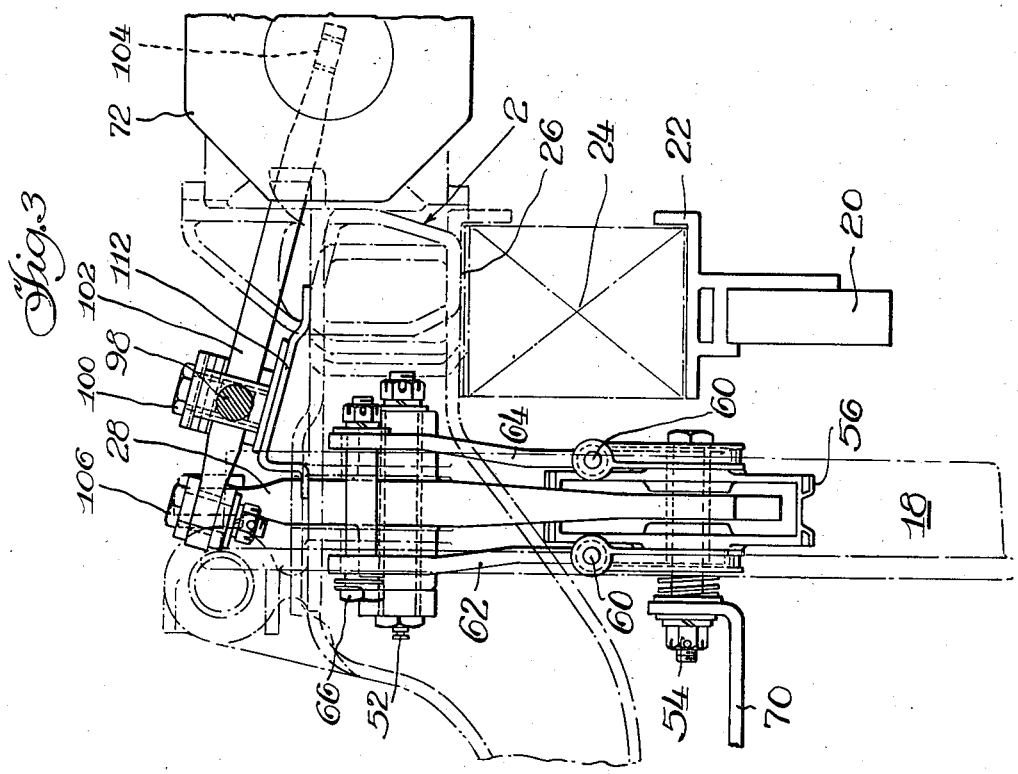
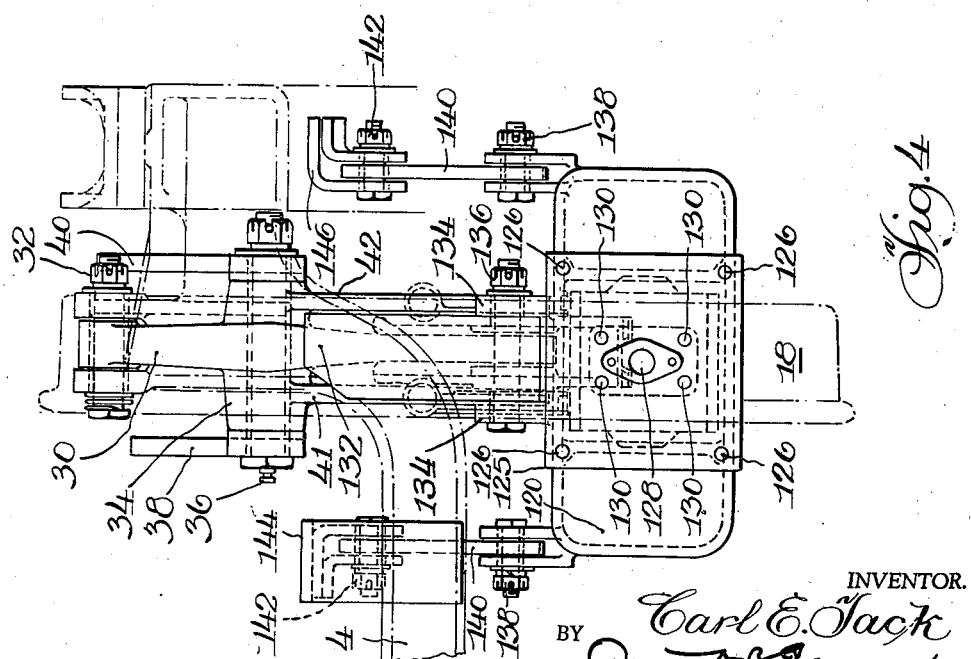
INVENTOR.
Carl E. Tack
BY
Orrin O.B. Farmer
Atty Oct. 10, 1944.  C. E. TACK  2,359,740
CLASP BRAKE
Filed July 8, 1942  3 Sheets-Sheet 3

INVENTOR.
Carl E. Tack
BY
Atty

Patented Oct. 10, 1944

2,359,740

UNITED STATES PATENT OFFICE 2,359,740

CLASP BRAKE

Carl E. Tack, Chicago, Ill., assignor to American Steel Foundries, Chicago, Ill., a corporation of New Jersey Application July 8, 1942, Serial No. 450,137

15 Claims. (Cl. 188—33)

My invention relates to brake rigging for a railway car truck. For many years the principal method of braking railway rolling stock has involved the application of brake shoes to the tread surfaces of the wheels. In recent years certain designs of brakes have been created in which braking forces have been applied to other than the tread surfaces of the wheels. In such brakes it has frequently been found desirable to utilize composition brake lining on the member to be braked or on the friction shoes braking said member. Accordingly, it is an object of my invention to devise an arrangement wherein friction shoes comprising composition braking material may be supported for frictional engagement with the inboard and outboard faces or sides of the rims of the associated wheels.

My invention comprehends an arrangement wherein a housing is supported from the truck frame outwardly of each wheel, said housing receiving the ends of a pair of brake levers pivotally fulcrumed intermediate the ends thereof from said housing and extending therefrom at opposite sides of said wheel to support brake shoes of the type above described, said shoes being formed and arranged for engagement with inboard and outboard surfaces on the wheel.

It is well known to those skilled in the art that the application of conventional clasp brakes to the wheel and axle assemblies associated with a railway car truck results in a snubbing effect which prevents uncontrolled action of the spring means interposed between the truck frame and the journal boxes of the assemblies, and it is therefore a further object of my invention to obtain this snubbing effect by means of off-tread brake shoes supported solely from the truck frame as well as by means of the conventional clasp brake rigging.

A further object of my invention is to devise a brake arrangement in which clasp brake rigging of the conventional type is associated with each vessel and axle in conjunction with off-tread brake means such as above described.

A characteristic or well known phenomenon peculiar to composition brake lining is a lowering of the friction co-efficient as the speed of the braked member decreases. In other words, when composition brake lining is utilized the co-efficient of friction is sharply reduced as the speed approaches zero and this fade, as it is commonly described, is considered particularly undesirable for railway use since it makes it difficult accurately to stop a train, and, moreover, it tends to lengthen a stop at the most critical point of an emergency. The contrary is true of metal to metal braking surfaces such as are more commonly used on railway equipment at the present time. In other words, the co-efficient of friction for metal to metal contact rises as the speed is reduced and this at times tends to cause the brake shoes to "seize" the wheels, thus causing wheel slippage with respect to the rails unless the braking pressure is reduced somewhat with reduction of speed. I have conceived the desirability of utilizing in conjunction the two types of braking surfaces in order to secure the advantages of both and at the same time eliminate to a degree at least the disadvantages which normally accompany the use of either alone. By this means I am able to produce a relatively smooth torque curve as compared with the torque curve which will be produced in utilizing either of the above types of brake by itself.

A further object of my invention, therefore, is to devise a novel form of brake arrangement utilizing metal to metal friction surfaces in conjunction with metal and composition braking surfaces in order to secure the advantages of both types of brakes and to eliminate the disadvantages associated with each.

A specific object of my invention is to devise a brake arrangement such as above described wherein live and dead truck levers support metal friction shoes for engagement with the tread surfaces of the metal wheels and wherein brake levers at opposite sides of each wheel support composition brake shoes for engagement with inboard and outboard surfaces on said wheels, said brake levers being actuated independently of said truck levers.

Still another object of my invention is to devise a brake arrangement such as above described in which the power means associated with the truck levers as well as the power means associated with the brake levers is mounted on the truck frame in what is frequently called a unit cylinder arrangement.

In the drawings, Figure 1 is a fragmentary plan view of a railway car truck embodying my invention, only one-half of the truck being shown inasmuch as it is similar at opposite sides thereof.

Figure 3 is an enlarged sectional view taken in the vertical plane indicated by the lines 3—3 of Figure 1, and Figure 4 is an enlarged end view taken from the left as seen in Figures 1 and 2.

Figure 1:
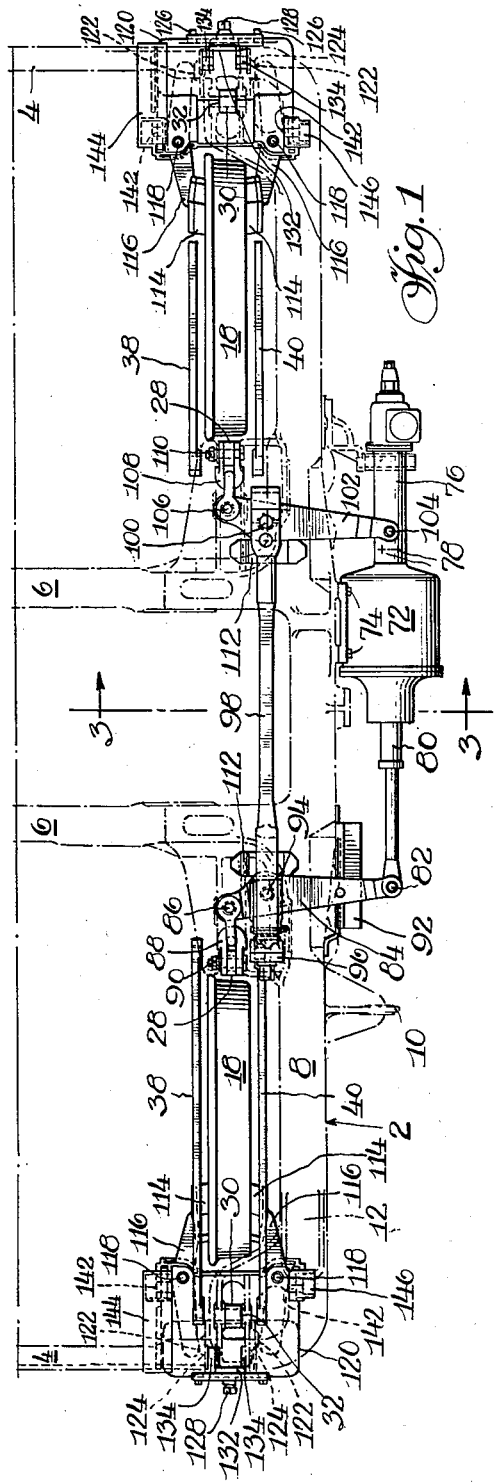
Figure 2:
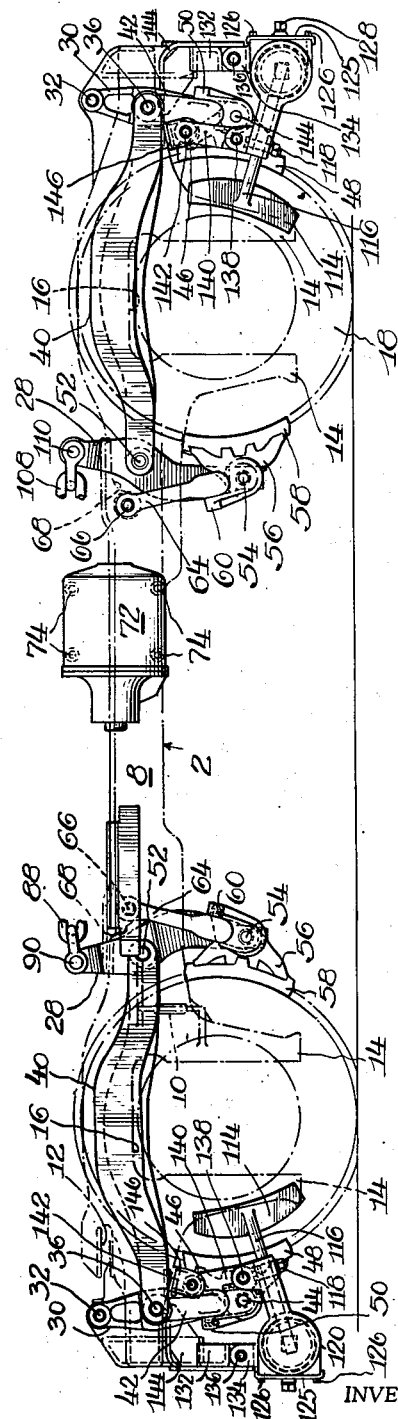
Figure 2 is a side elevation of the structure shown in Figure 1.
Figure 5:
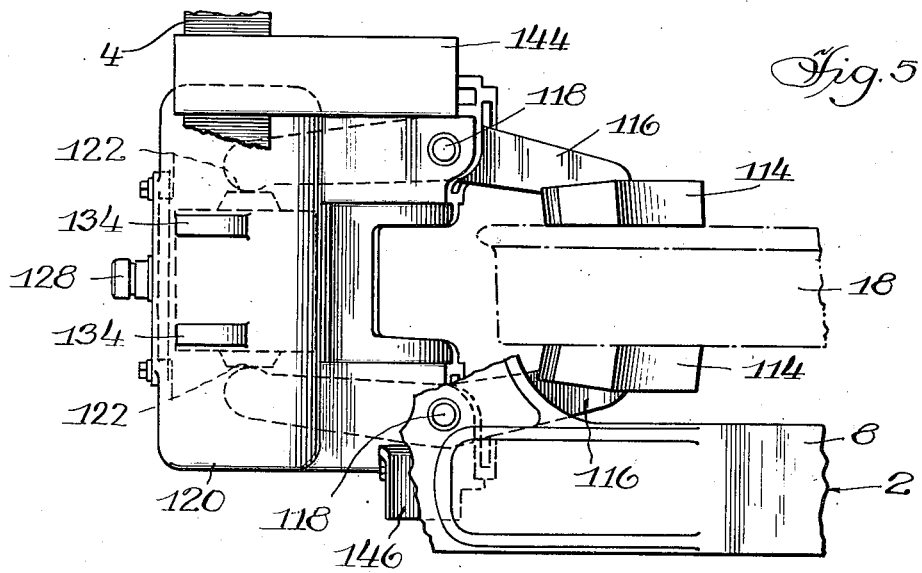
Figures 5 and 6 are respectively a top plan view and a side elevation of the brake mechanism at the left end of the truck, portions of the truck frame and brake mechanism being omitted to clarify the illustration.
Figure 6:
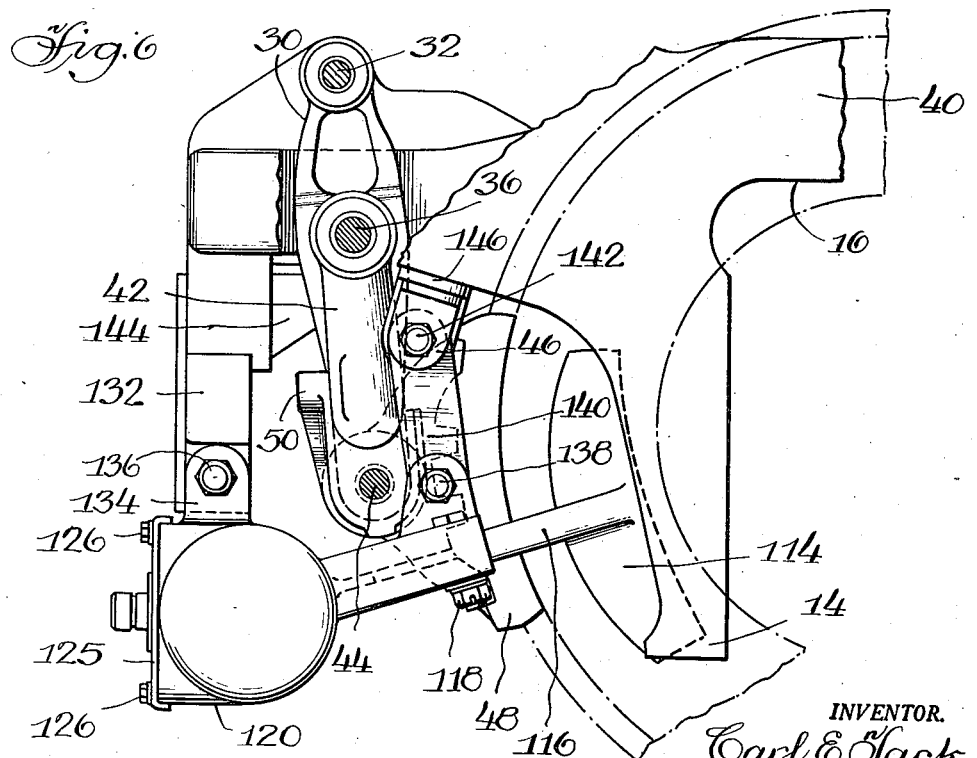

In each of said figures certain details may be omitted where they are more clearly seen in other views.

Describing my invention in detail, the truck frame generally designated 2 comprises the end rails 4, 4 and the intermediate spaced transoms 6, 6 as well as a side rail 8 at each side of the frame, said transoms affording support in the usual manner for a bolster (not shown) upon which may be mounted an associated car body. On the outboard face of each side rail adjacent one end thereof is a bracket 10, said bracket affording a means of connection to an associated draft rod (not shown), the opposite end of said rod being connected to the adjacent end of the bolster. The side rail is also formed with a jaw 12 affording fulcrum means for an associated hand brake lever (not shown). The side rail is also formed adjacent each end of the bolster with the spaced pedestal jaws 14, 14 defining the pedestal opening 16 receiving a journal box (not shown) associated with the wheel and axle assembly 18, the journal boxes at each side of the truck affording support for an equalizer 20 (Figure 3) which supports at each end thereof in the usual manner a spring seat 22 which in turn supports and affords positioning means for a spring group diagrammatically indicated at 24 (Figure 3), said group being seated at 26 against the associated portion of the side rail 8 and affording support for the truck frame 2 in the usual manner.

It will be understood by those skilled in the art that the wheels of the wheel and axle assemblies 18, 18 are formed of ferrous metal such as cast iron or cast steel. At opposite sides of each wheel are the live and dead truck levers 28 and 30, the dead lever being pivotally fulcrumed at 32 from the truck frame and comprising a trunnion portion 34 pivotally connected at 36 to the inboard and outboard straps 38 and 40, said straps affording a means of connection to the associated live lever as hereinafter described. Depending from the trunnion portion 34 of the dead lever 30 are the inboard and outboard hanger arms 41 and 42 at opposite sides of the dead lever 30, said lever and said hanger arms being pivotally connected at 44 to the brake head 46 carrying a cast iron brake shoe 48 for engagement with the peripheral surface of the adjacent wheel in the usual manner, said brake head being provided with balancing means 50, 50 of usual form.

The straps 38 and 40 are pivotally connected at 52 to the live truck lever 28, said live truck lever being pivotally connected at 54 to the brake head 56 carrying a cast iron brake shoe 58 for engagement with the peripheral surface of the adjacent wheel and said brake head being provided with balance means 60, 60 of usual form. Inboard and outboard brake hangers 62 and 64 are pivotally connected at the pivot point 54 to the brake head 56 and are pivotally connected at their opposite ends at 66 to the bracket 68 on the truck frame 2. Also connected at the pivot point 54 is the tie rod 70 (Figure 3) extending between the brake heads 56, 56 at opposite sides of the truck frame.

A power cylinder 72 is secured at 74, 74 to the truck frame and a slack adjuster 76 (Figure 1) is secured at 78, 78 to one end of the cylinder 72, a piston rod 80 projecting from the opposite end of the cylinder and being pivotally connected at 82 to the outboard end of the diagonal live cylinder lever 84. The live cylinder lever 84 is pivotally connected at the inboard end thereof at 86 to the clevis means 88, said clevis means being pivotally connected at 90 to the associated live truck lever 28, said cylinder lever 84 being supported adjacent the outboard end thereof by a bracket 92 on the truck frame.

The cylinder lever 84 is connected at 94 to the slack adjuster end 96 of the pull rod 98 pivotally and adjustably connected at its opposite end at 100 to the diagonal dead cylinder lever 102 and the dead cylinder lever 102 is connected at its outboard end at 104 to the slack adjuster 76 and is pivotally connected at its inboard end at 106 to the clevis means 108, said clevis means being pivotally connected at 110 to the associated live truck lever 28. The pull rod 98 is supported adjacent opposite ends thereof by brackets 112, 112 supported on the truck frame.

The off-tread brake means associated with each wheel comprises friction shoes 114, 114 of composition braking material and formed and arranged for engagement with the inboard and outboard sides of the rim of said wheel, said shoes 114, 114 being supported by respective brake levers 116, 116 embracing the lower end of the associated brake head 46, said brake levers being pivotally fulcrumed at 118, 118 respectively to the cylinder housing 120 and extending into said housing for abutment at 122, 122 respectively with the operating pistons 124, 124 (Figure 1). Each housing 120 is provided with an opening in the outer side thereof for the insertion and removal of the pistons 124, 124, said opening being sealed by a cover plate 125 secured to said housing at 126, 126 by spaced stud bolts or any other convenient means, and a nozzle 128 is secured at 130, 130 to said cover plate 125, said nozzle affording convenient attaching means for a fluid supply line (not shown), as will be understood.

Support for each housing 120 comprises a bracket 132 secured to the truck frame 2 adjacent the juncture of the side rail with the end rail, said bracket being secured to spaced lugs 134, 134 on the housing at the pivot point 136. The end of the housing adjacent the wheel is connected at opposite sides thereof at 138, 138 to respective links 140, 140, said links being pivotally connected at 142, 142 respectively to the inboard and outboard brackets 144 and 146, the inboard bracket 144 being welded or secured by any other convenient means to the end rail 4 and the outboard bracket 146 being welded or otherwise secured to the side rail 8 outwardly of the outer pedestal jaw 14. It will be understood by those skilled in the art that the pivotal connections at 136, 138 and 142 permit slight movement of the cylinder housing 120 during actuation of the brake shoes 114, 114, said movement reducing torque stresses on the cylinder housing support means.

Thus it will be apparent that I have designed a novel type of brake rigging in which friction shoes 114, 114 of composition material are arranged for engagement with inboard and outboard surfaces of the associated wheel and other friction shoes 48 and 58 are arranged for frictional engagement with the peripheral surfaces of said wheel at substantially opposed points thereon, the brake shoes 114, 114 being actuated by brake levers 116, 116 embracing the associated shoe 48 and being operatively connected to power means hung from the outer end of the truck frame.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a truck frame, spaced supporting wheel and axle assemblies each including an axle with wheels thereon, interconnected live and dead truck levers at opposite sides of each wheel, brake heads and shoes carried by said levers for braking application to respective wheels, actuating means associated with said live levers, and brake mechanism for each wheel comprising a housing extending at inboard and outboard sides of the brake head carried by one of said levers, brake levers extending into said housing and pivotally fulcrumed therefrom at respective points inboard and outboard the associated brake head, friction means on said brake levers for engagement with inboard and outboard surfaces on the associated wheel, and a three point support for said housing constituting the sole means for transmission of braking torque from said mechanism to said truck frame, one of said points being spaced longitudinally of the truck from the adjacent truck lever and disposed outwardly thereof, and two of said points being disposed inwardly of the last-mentioned lever in a direction longitudinally of the truck.

2. In a brake arrangement for a railway car truck, a truck frame, spaced supporting wheel and axle assemblies each including an axle with wheels thereon, interconnected live and dead truck levers at opposite sides of each wheel, brake heads and shoes carried by said levers for braking application to respective wheels, actuating means associated with said live levers, and brake mechanism for each wheel comprising a housing extending at inboard and outboard sides of the brake head carried by one of said levers, brake levers extending into said housing and pivotally fulcrumed therefrom at respective points inboard and outboard the associated brake head, friction means on said brake levers for engagement with inboard and outboard surfaces on the associated wheel, and a support for said housing constituting the sole means for transmission of braking torque from said brake mechanism to said truck frame, said support being at spaced points longitudinally of the truck inwardly and outwardly of the adjacent dead truck lever.

3. In a brake arrangement for a railway car truck, a truck frame comprising spaced side rails and spaced end rails, spaced supporting wheel and axle assemblies each including an axle with wheels thereon, interconnected live and dead truck levers at opposite sides of each wheel, brake heads and shoes carried by said levers for braking application to respective wheels, actuating means associated with said live levers, and brake mechanism for each wheel comprising a housing extending at inboard and outboard sides of the brake head carried by one of said levers, brake levers extending into said housing and pivotally fulcrumed therefrom at respective points inboard and outboard the associated brake head, friction means on said brake levers for engagement with inboard and outboard surfaces on the associated wheel, and a three point support for said housing comprising a pivotal connection to the adjacent end rail of the truck, and spaced inboard and outboard links pivotally connected to said housing and to said truck frame at inboard and outboard sides of the plane of the adjacent wheel.

4. In a brake arrangement for a railway car truck, a truck frame, spaced supporting wheel and axle assemblies each including an axle with wheels thereon, interconnected live and dead truck levers at opposite sides of each wheel, brake heads and shoes carried by said levers for braking application to respective wheels, actuating means associated with said live levers, and brake mechanism for each wheel comprising a housing extending at inboard and outboard sides of the brake head carried by one of said levers, brake levers extending into said housing and pivotally fulcrumed therefrom at respective points inboard and outboard the associated brake head, friction means on said brake levers for engagement with inboard and outboard surfaces on the associated wheel, and a three point support for said housing constituting the sole means for transmission of braking torque from said mechanism to said truck frame, one of said points being spaced longitudinally of the truck from the adjacent truck lever and disposed outwardly thereof, and two of said points being disposed inwardly of the last-mentioned lever in a direction longitudinally of the truck, the brake levers associated with each of said housings lying in a plane inclined with respect to the horizontal.

5. In a brake arrangement for a railway car truck, a truck frame, spaced supporting wheel and axle assemblies each including an axle with wheels thereon, interconnected live and dead truck levers at opposite sides of each wheel, wheel, brake heads and shoes carried by said levers for braking application to respective wheels, actuating means associated with said live levers, and brake mechanism for each wheel comprising a housing extending at inboard and outboard sides of the brake head carried by one of said levers, brake levers extending into said housing and pivotally fulcrumed therefrom at respective points inboard and outboard the associated brake head, friction means on said brake levers for engagement with inboard and outboard surfaces on the associated wheel, said housings being disposed at opposite ends of the truck and outwardly of said assemblies, and a support for each housing from the truck frame.

6. In a brake arrangement for a railway car truck, a truck frame, spaced supporting wheel and axle assemblies each including an axle with wheels thereon, interconnected live and dead truck levers at opposite sides of each wheel, brake heads and shoes carried by said levers for braking application to respective wheels, actuating means associated with said live levers, and brake mechanism for each wheel comprising a housing extending at inboard and outboard sides of the brake head carried by one of said levers, brake levers extending into said housing and pivotally fulcrumed therefrom at respective points inboard and outboard the associated brake head, friction means on said brake levers for engagement with inboard and outboard surfaces on the associated wheel, and a support for said housing constituting the sole means for transmission of braking torque from said mechanism to said truck frame.

7. In a brake arrangement for a railway car truck, a truck frame comprising spaced side members and spaced end members, spaced supporting wheel and axle assemblies each including an axle with wheels thereon, interconnected live and dead truck levers at opposite sides of each wheel, the live levers being disposed inwardly of said assemblies and the dead levers being disposed outwardly thereof, brake heads and shoes carried by said levers for braking application to said wheels, actuating means associated with said live levers, and brake mechanism comprising a cylinder housing supported adjacent each wheel from one of said side members and one of said end members adjacent their juncture, said housing affording fulcrums at inboard and outboard sides of the adjacent brake head, brake levers extending within said housing for pivotal connection to said fulcrums, and friction means carried by said brake levers for engagement with inboard and outboard surfaces on the adjacent wheel.

8. In a brake arrangement for a vehicle comprising a vehicle frame and a supporting wheel and axle assembly including an axle and a member rotatable therewith, the combination of brake mechanism including spaced friction means formed and arranged for braking engagement with inboard and outboard sides of said rotatable member, brake levers connected to respective friction means, a support member affording fulcrums for respective levers, a connection between the frame and the support member in the plane of said rotatable member, spaced connections between the frame and the support member inboardly and outboardly of said plane, and actuating means for said mechanism comprising power means operatively associated with said levers.

9. In a brake arrangement for a railway car truck having spaced side rails and interconnected end rails, spaced supporting wheel and axle assemblies each including an axle with wheels thereon, and brake mechanism comprising a cylinder housing supported adjacent each wheel from one end rail and one side rail, and brake levers fulcrumed from said housing and carrying friction means for engagement with inboard and outboard surfaces on said wheel, the support for said housing being the sole means for transmission of torque from said mechanism to said truck and comprising a pivotal connection between the housing and said end rail, and a link pivotally connected to said side rail and to said housing.

10. In a brake arrangement for a railway car truck having spaced side rails and interconnected end rails, a supporting wheel and axle assembly including an axle and a member rotatable therewith, and brake mechanism comprising a cylinder housing supported adjacent said member from one end rail and one side rail adjacent their juncture, and friction means carried by said housing for engagement with said member, the support for said housing being the sole means for transmission of torque from said mechanism to said truck, and said support comprising a pivotal connection between the housing and said end rail, and a link pivotally connected to said side rail and to said housing.

11. In a brake arrangement, a vehicle frame, a supporting wheel and axle assembly comprising an axle and a member rotatable therewith, friction means for engagement with inboard and outboard sides of said member, brake levers connected to respective friction means, a cylinder housing affording fulcrums for respective levers, and a three point support from said frame for said housing, said support comprising a pivotal connection between the frame and the housing in the plane of said member, and a plurality of spaced links pivotally suspended from said frame at opposite sides of said plane, said links being pivotally connected to said housing.

12. In a brake arrangement, a vehicle frame, a supporting wheel and axle assembly comprising an axle with a wheel thereon, friction means for engagement with inboard and outboard sides of said wheel, brake levers carrying respective friction means, a cylinder housing affording fulcrums for respective levers, and a three point support from said frame for said housing, said support comprising a pivotal connection between the frame and the housing in the plane of said wheel, and a plurality of spaced links pivotally suspended from said frame inboardly and outboardly of said plane, said links being pivotally connected to said housing.

13. In a brake arrangement, a vehicle frame, a supporting wheel and axle assembly comprising an axle and a member rotatable therewith, friction means for engagement with inboard and outboard sides of said member, brake levers connected to respective friction means, a cylinder housing affording fulcrums for respective levers, and a support from said frame for said housing, said support comprising a pivotal connection between the frame and the housing in a vertical plane extending longitudinally of the frame and bisecting said member, and a plurality of spaced links pivotally suspended from said frame inboardly and outboardly of said plane, said links being pivotally connected to said housing.

14. In a brake arrangement, a vehicle frame, a supporting wheel and axle assembly comprising an axle and a member rotatable therewith, friction means for engagement with inboard and outboard sides of said member, brake levers connected to respective friction means, a cylinder housing affording fulcrums for respective levers, and a three point support from said frame for said housing, said support comprising a pivotal connection between said housing and an end of said frame and said support comprising a plurality of spaced inboard and outboard links pivotally suspended from said frame and pivotally connected to said housing.

15. In a brake arrangement, a vehicle frame, a supporting wheel and axle assembly comprising an axle and a member rotatable therewith, and brake mechanism comprising friction means for engagement with inboard and outboard sides of said member, brake levers connected to respective friction means, a cylinder housing affording fulcrums for respective levers, and a three point support from said frame for said housing constituting the sole means for transmitting braking torque from said mechanism to said frame, said support comprising a pivotal connection between the frame and the housing, and a plurality of spaced inboard and outboard links pivotally suspended from said frame and pivotally connected to said housing, said links being disposed inboardly and outboardly of said member.

CARL E. TACK.